US012202286B2

(12) United States Patent
Riegler et al.

(10) Patent No.: US 12,202,286 B2
(45) Date of Patent: Jan. 21, 2025

(54) STAMP AND AXLE ELEMENT FOR SAID STAMP

(71) Applicant: Trodat GmbH, Wels (AT)

(72) Inventors: Konrad Riegler, Eberstalzell (AT); Helmut Lindner, Peuerbach (AT)

(73) Assignee: Trodat GmbH, Wels (AT)

( * ) Notice: Subject to any disclaimer, the term of this patent is extended or adjusted under 35 U.S.C. 154(b) by 16 days.

(21) Appl. No.: 18/039,776

(22) PCT Filed: Nov. 9, 2021

(86) PCT No.: PCT/AT2021/060424
§ 371 (c)(1),
(2) Date: Jun. 1, 2023

(87) PCT Pub. No.: WO2022/115889
PCT Pub. Date: Jun. 9, 2022

(65) Prior Publication Data

US 2024/0017560 A1 Jan. 18, 2024

(30) Foreign Application Priority Data

Dec. 3, 2020 (AT) .............................. A 51054/2020

(51) Int. Cl.
*B41F 1/40* (2006.01)
*B41K 1/56* (2006.01)

(52) U.S. Cl.
CPC ..................................... *B41K 1/56* (2013.01)

(58) Field of Classification Search
CPC ... B41K 1/00; B41K 1/12; B41K 1/36; B41K 1/40; B41K 1/42; B41K 1/56
See application file for complete search history.

(56) References Cited

U.S. PATENT DOCUMENTS

2009/0139060 A1* 6/2009 Shih ......................... B41K 1/56 16/421

FOREIGN PATENT DOCUMENTS

AT 200301647 A * 12/2004 ............... B41K 1/36
DE 2020162 A1 11/1971

(Continued)

OTHER PUBLICATIONS

International Search Report (with translation) and Written Opinion for International Application No. PCT/AT2021/060424 date mailed Mar. 15, 2022, 11 pages.

*Primary Examiner* — Christopher E Mahoney
*Assistant Examiner* — Marissa Ferguson-Samreth
(74) *Attorney, Agent, or Firm* — Kowert, Hood, Munyon, Rankin & Goetzel, P.C.; Gareth M. Sampson

(57) ABSTRACT

The present disclosure relates to a stamp, comprising at least a stamping component and a stamping insert. The stamping component is formed of a top part and a bottom part with a cushion -receiving element and the stamping insert is connected to the top part via a reversing mechanism. The stamping insert is mounted via a continuous axle in an axle bearing element. In the resting position a text plate and/or MB unit (mounted band unit) mounted on the impression unit butts against an ink cartridge with ink pad soaked with stamping ink in the cushion-receiving element and in a stamping process for producing a stamp impression in a stamp position the stamping insert can be shifted by the reversing mechanism into a stamping position. The axle bearing element can be inserted and fastened in the top part via guide webs.

15 Claims, 5 Drawing Sheets

(56) References Cited

FOREIGN PATENT DOCUMENTS

| | | | | | |
|---|---|---|---|---|---|
| JP | S5494925 | A | 7/1979 | | |
| WO | WO-2014113832 | A1 * | 7/2014 | ............... | B41K 1/36 |
| WO | WO-2020061602 | A1 * | 4/2020 | ............... | B41K 1/12 |
| WO | WO-2020150764 | A1 * | 7/2020 | ............... | B41K 1/02 |

* cited by examiner

STAMP AND AXLE ELEMENT FOR SAID STAMP

PRIORITY CLAIM

This application is a U.S. National Stage filing of International Application No. PCT/AT2021/060424, filed Nov. 9, 2021, which claims the benefit of priority to the Austrian Application No. A51054/2020, filed Dec. 3, 2020, each of which are incorporated herein by reference in their entirety.

BACKGROUND

Technical Field of the Invention

The present disclosure relates to a stamp and an axle element for a stamp.

Description of the Related Art

AT 513900 A1 discloses a self-inking stamp with a housing formed by a top part and a bottom part, in which an impression unit is described that is displaceable relative to the housing and is mounted in the top part via an axle. Here the axle is held on both side faces of the top part with an insertable axle bearing element. The axle bearing element furthermore has an aperture or recess for a lock fastened and insertable in the top part, so that when the lock is actuated it can be pushed through the opening or recess, respectively, in the axle bearing element and thus engages with the bottom part, holding the stamp in a stamp position.

The disadvantage here is that a large number of individual parts are required for the stamp, resulting in a very high assembly effort. In many cases where there are so many and small parts present, such as the axle bearing element and the lock, these need to be installed manually, i.e. by hand, in the housings, especially in the top part.

Furthermore, EP 1673229 B1 discloses a self-inking stamp that also consists of a top part, a bottom part and an impression unit coupled to the top part. Here the impression unit is in turn attached to the top part via an axle and an axle bearing element, whereby the axle bearing element now also serves as a lock in that the axle bearing element is attached to the top part in a horizontally displaceable fashion.

Furthermore, various stamps are known from the prior art in which a bearing element is used for the axle, whereby the axle is usually fastened via a fixing disc or fixing element to protect it from falling out. Such a stamp is known e.g. from AT 515227 A1.

AT521730 A1 discloses a so-called self-inking office stamp with an axle bearing element. Here, the stamp has a bow-shaped top part, which in turn is coupled to the bottom part via the impression unit. In the bottom part, an axle bearing element is attached to the side faces, wherein the axle bearing element has an elongated hole in which a sliding bush for the axle is positioned and attached so as to be displaceable. Here, the lock for fixing the stamp in a defined stamping position is located centrally in the area of the knob in the bow-shaped top part.

SUMMARY

The objective of the present disclosure is to provide a stamp and an axle bearing element for a stamp in which on the one hand the aforementioned disadvantages are avoided and on the other hand simple and rapid assembly is enabled.

The objective is achieved by the present disclosure.

The objective of the present disclosure is achieved by a stamp, wherein the axle bearing element can be pushed into the top part via guide webs and is fastened, in particular latched, there, wherein a locking head for fixing a stamping position is connected to the axle bearing element via an elastically deformable connecting web.

The advantage here is that both the axle bearing and the locking head can be mounted in the top part in a single working step.

Advantageous embodiments are also such in which the guide webs for the axle bearing element are formed on the side faces of the top part associated with the inner space of the top part. This ensures that the axle bearing is located inside the top part and is thus not visible from without.

Advantageous embodiments are also such in which the guide webs comprise a latching element, in particular a latching edge, for fastening of the insertable axle bearing element. This ensures that only the axle bearing element has to be inserted for assembly, resulting in automatic latching. Thus no separate work step is necessary for fastening.

In another advantageous embodiment, however, the axle bearing element can be inserted into the guide webs of the top part from below. This allows automated loading of the top part with the axle bearing element.

In another advantageous embodiment, on the top part a locking head opening corresponding to the locking head is provided. This enables the locking head to protrude outwards through the housing of the top part so that it can be easily actuated.

Advantageous embodiments are also such in which the locking head of the axle bearing element projects outwards through the locking head opening when the axle bearing element is inserted, whereby the locking head is flush with the outer surface of the side wall or projects beyond the outer surface of the side wall. This ensures that it can be easily detected and operated by the user.

In yet another advantageous embodiment, the axle bearing element has a horizontally aligned elongated hole or elongated hole recess for receiving the axle for the impression unit, wherein an angularly extending insertion surface is preferably arranged in the central region. This ensures that the axle is simply picked up and mounted.

Furthermore, the objective of the present disclosure is achieved by an axle bearing element in which one or more elastically deformable latching elements (15) are arranged on the base body, and a locking head is connected to the base body via an elastically deformable connecting web. It is advantageous here that the locking head for the latch is installed at the same time as the axle bearing element is. Thus, the axle bearing and the lock can be installed in the top part in one step.

In yet another advantageous embodiment, the axle bearing element is designed as a one-piece injection-molded plastic part. This results in cost-effective production, as only one tool is needed for the axle bearing and the lock. Of course, several axle bearing elements can be produced at once in this one tool, as is usual.

Advantageous embodiments are such in which an angularly extending insertion surface for insertion of an axle is arranged in the central region. This ensures that when the axle is inserted, in particular when it is pressed in, on the one hand the axle is guided and on the other hand the angular course of the insertion surface supports the pressing apart of the side faces of the stamp for insertion of the axle.

In an advantageous embodiment, two latching elements are arranged on the base body. This ensures that by simply pushing the axle bearing element into guide rails on the top part, it locks into place in the guide rails.

Advantageous embodiments are such in which the two latching elements are formed on the opposite side of the insertion surface on the base body, whereby they extend away from the base body. This ensures that the component thickness of the axle bearing element is kept very low, as the latching takes place above the base body.

However, in another advantageous embodiment between the two latching elements the connecting web for the locking head is connected to the base body. This allows for a very compact design. Moreover, this allows placement of the locking head at a distance from the base body, achieving appropriate flexibility.

Finally, in an advantageous embodiment the axle bearing is formed from a 2k injection-molded part, wherein the locking head is preferably formed from a different plastic material than the remaining components are. This ensures that for the locking head, with which the user is in constant contact, a high-quality plastic with good gripping properties is used, whereas the axle bearing is preferably formed from largely or completely recycled plastic. This allows considerable cost savings by using a 2k injection molding workpiece, as only a small part of the entire component needs to be formed from an expensive high-quality plastic.

The invention is described hereinafter in the form of exemplary embodiments, wherein attention is drawn to the fact that the invention is not limited to the exemplary embodiments or solutions, respectively, represented and described.

DETAILED DESCRIPTION OF EMBODIMENTS

Figure 1:
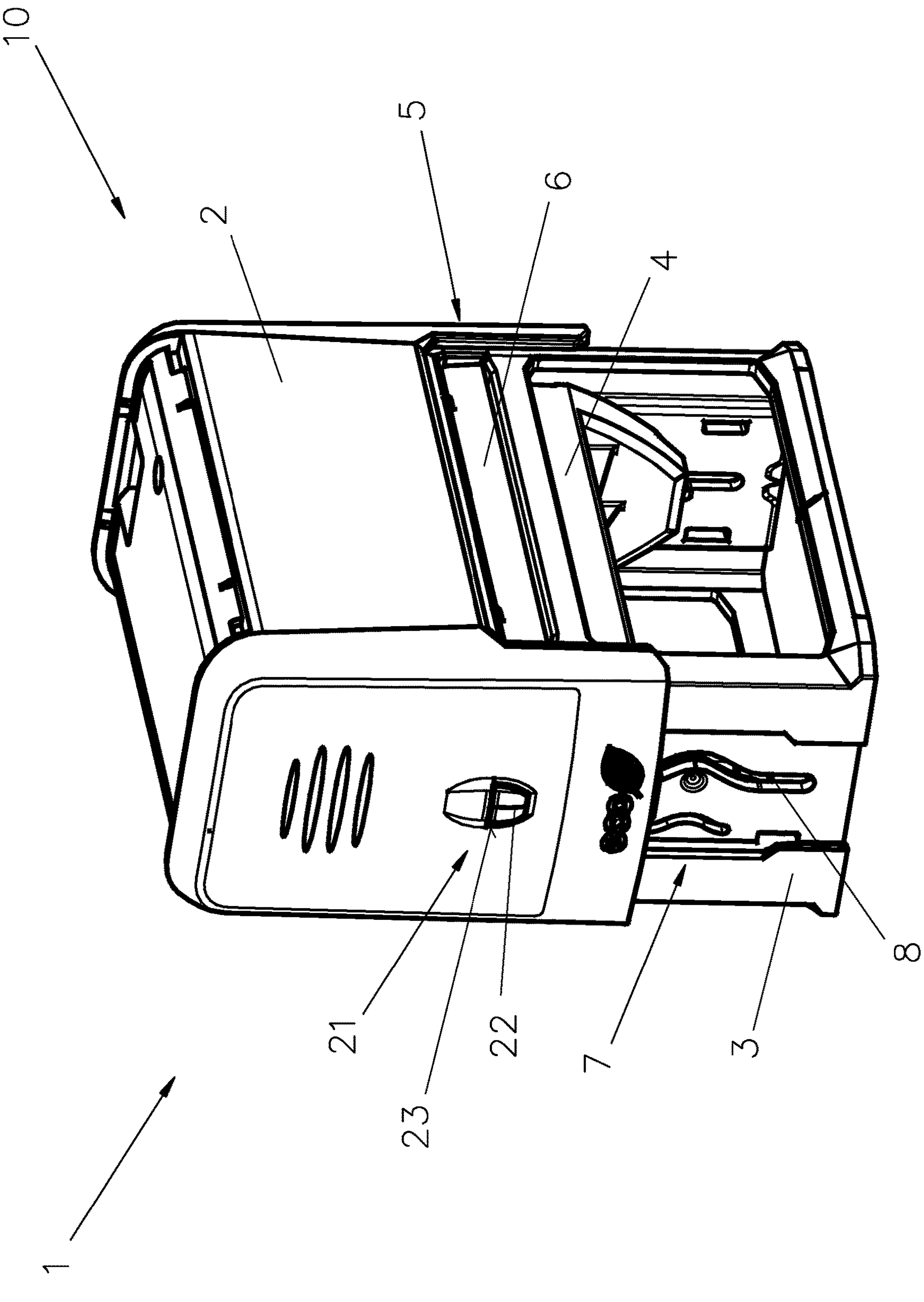
FIG. 1 is a schematic illustration of an assembled stamp, particularly a self-inking stamp, in the resting position; simplified, for illustrative purposes only.
Figure 3B:
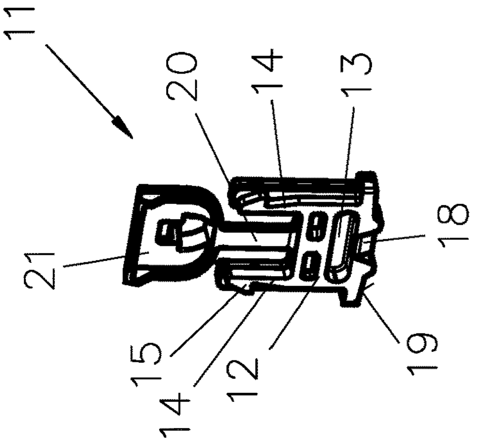
FIG. 3*b* is another schematic illustration of the axle bearing element, from the other side; simplified, for illustrative purposes only.
Figure 3A:
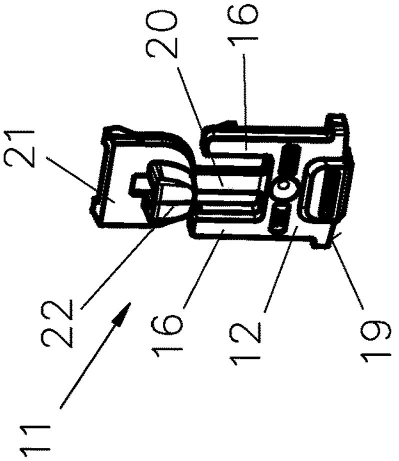
FIG. 3*a* is a schematic illustration of the axle bearing element; simplified, for illustrative purposes only.
Figure 3C:
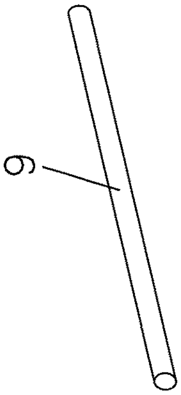
FIG. 3*c* is another schematic illustration of the axle for the mounting of the stamping insert in the axle bearing element; simplified, for illustrative purposes only.
Figure 2:
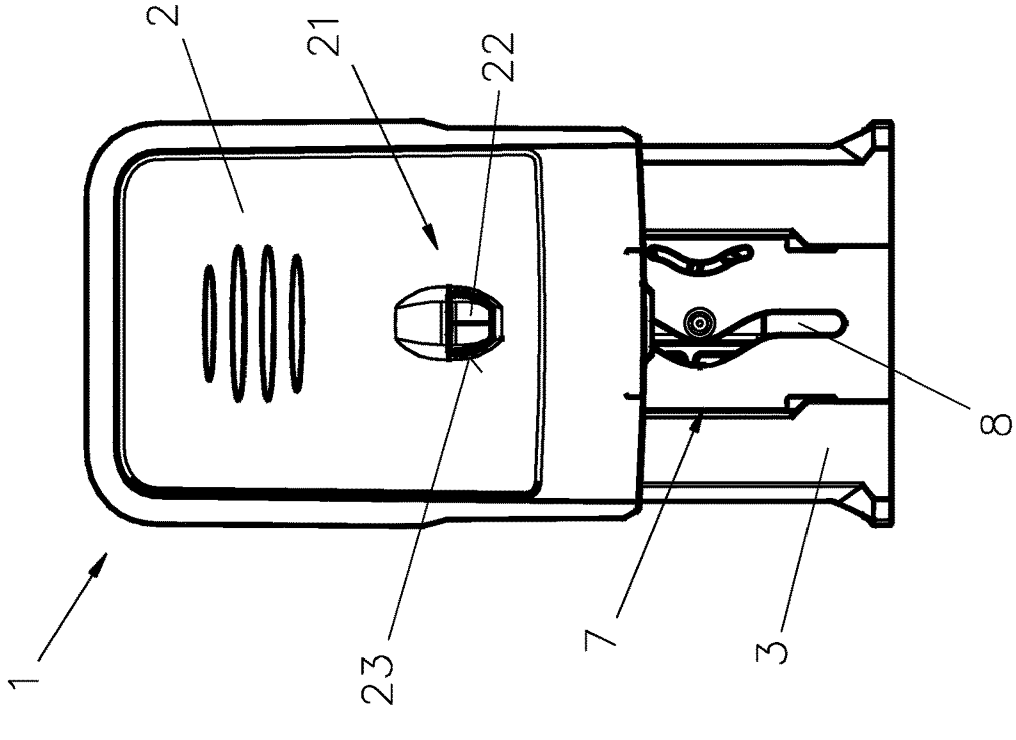
FIG. 2 is a longitudinal view of the stamp in the resting position; simplified, for illustrative purposes only.
Figure 4:
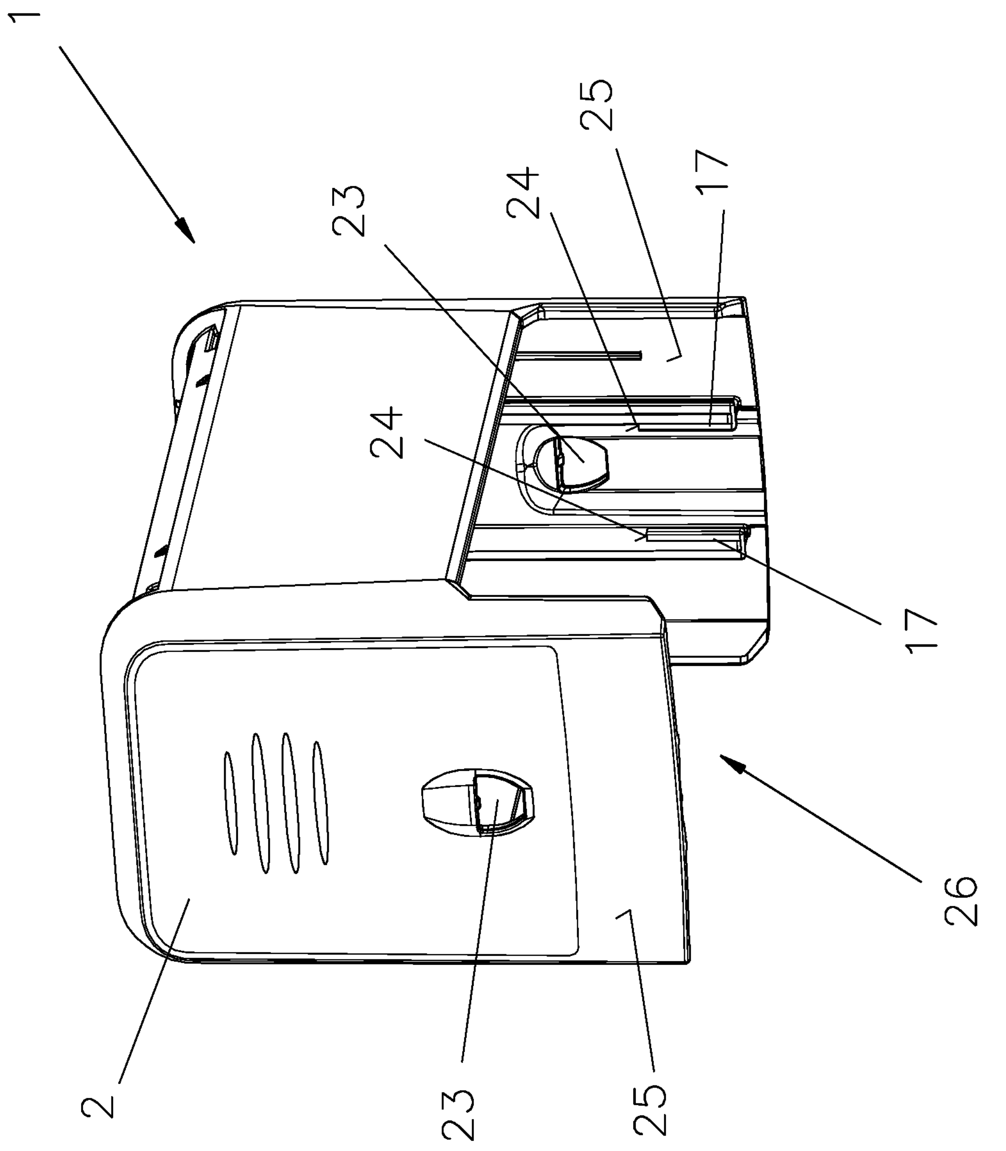
FIG. 4 is a schematic illustration of the top part without axle bearing element; simplified, for illustrative purposes only.

FIGS. 1 to 6 show a stamp 1, in particular a so-called self-inking stamp 1, comprising at least a stamping component, in particular a top part 2 and a bottom part 3, and a stamping insert 4, wherein in the bottom part 3 a cushion-receiving element 5 to accommodate an ink cartridge 6 is formed. The stamping insert 4 is connected via a reversing mechanism 7, which preferably comprises a slide track 8, in the bottom part 3 with the top part 4 so as to move synchronously. Here the stamping insert 3 is mounted via an axle 9 extending through the stamping insert 4. For the sake of completeness, it is mentioned that trunnions or two axle elements can alternatively be used if the stamping insert 4 is suitably designed. It is essential that the axle 10 or the trunnions or axle elements must protrude from the stamping insert 4 through the slide track 8 into the top part 2 in order to be coupled to the top part 2 there.

In a resting position 10 according to FIG. 1, a text plate and/or an MB unit (mounted band unit) (not shown) mounted on the stamping insert 3 butts against the ink cartridge with ink pad (6) soaked with stamping ink in the cushion-receiving element 5, so that in this position ink is absorbed from the ink cartridge 6. In a stamping process for producing a stamp impression, in a stamp position the stamping insert 3 with the text plate and/or the MB unit is moved into a stamping position via the reversing mechanism 7, whereby to this end the top part 2 is pushed over the bottom part 3 and the stamping insert 4 is rotated so that a spring element (not shown) arranged between the two elements is compressed, whereby subsequent automatic return to the resting position 10 is ensured. A detailed description of the reversing mechanism 7 and the combination of the stamp components, in particular the top part 2 over the bottom part 3, is omitted, as this has been disclosed innumerable times in so-called self-inking stamps 1 from the prior art. Also, a different type of reversing mechanism 7 than shown can be used, or alternatively a moving slide track 8 can be used to create a stamp impression.

Furthermore, it is pointed out that the solution according to the disclosed embodiments is not limited to the stamp shape shown—rectangular—but can also be applied to other shapes of stamp 1, such as, for example, square, elliptical, trapezoidal.

The present disclosure now envisions that an axle bearing element 11 is inserted or positioned, respectively, to couple the stamping insert 4 to the top part 2. This has the advantage that the axle bearing element for mounting and guidance is made of a material adapted for this purpose, in particular plastic, which may differ from the material of the top part 2 and/or bottom part 3.

Advantageously, a material having good sliding properties is used, so that a stamping operation can be carried out with low friction losses on the axle bearing. The adaptation of the material to the required properties will also increase the stamping comfort.

Here, the axle bearing element 11 has a base body 12 in which an elongated hole 13 or an elongated hole recess 13 is arranged for receiving and guiding the axle 10: the elongated hole 13 or the elongated hole recess 13 extends horizontally in the slide track 8 in order to support the movement of the axle 10 during a stamping operation. Furthermore, at least one but preferably two latching elements 14 are arranged on the base body 12, which have a latching hook 15. In the exemplary embodiment shown, the latching elements 14 are concomitantly designed as guide elements 16 for introduction in guide webs 17 in the top part 2.

Furthermore, the axle bearing element 11 has an angularly extending insertion surface 18 which supports insertion of the axle 10 into the elongated hole 13 or elongated hole recess 13, respectively, i.e. the angular course is designed in such a way that it extends from the elongated hole 13 or elongated hole recess 13, respectively, in the direction of the lower edge 19 of the base body 12, so that in the region of the lower edge 19 there is a smaller material thickness than in the region of the elongated hole 13 or elongated hole recess 13. The insertion surface 18 is this arranged at the opposite side of the base body 12 with the integrally formed latching elements 14.

Furthermore, on the side opposite of the insertion surface 18, a locking head 21 formed via an elastically deformable connecting web 20 is connected to the base body 12. Here, the connecting web 20 between the two guide elements 16 of the latching elements 14 is integrally formed on the base body 12, resulting in a one-piece component that can be installed in the top part 2 in one working step. Here the locking head 21 can have an actuating element 22 that projects through a locking head opening 23 in the top part 2.

Figure 5:
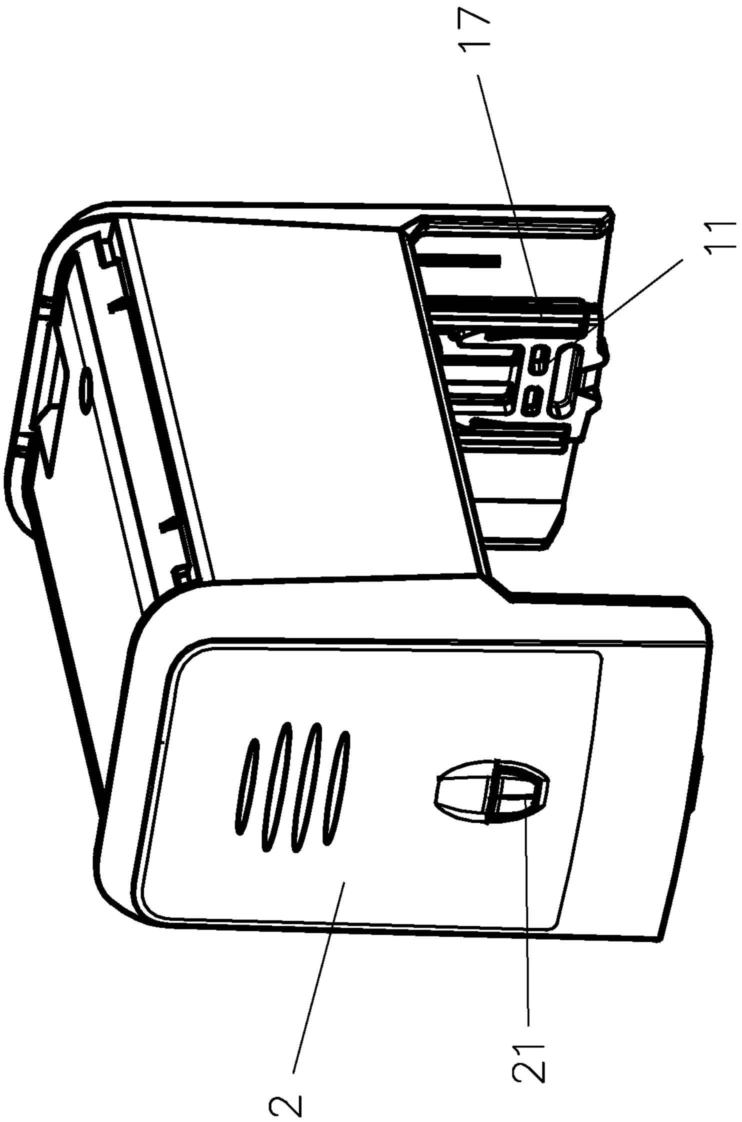
FIG. 5 is a schematic illustration with installed axle bearing element; simplified, for illustrative purposes only.
Figure 6:
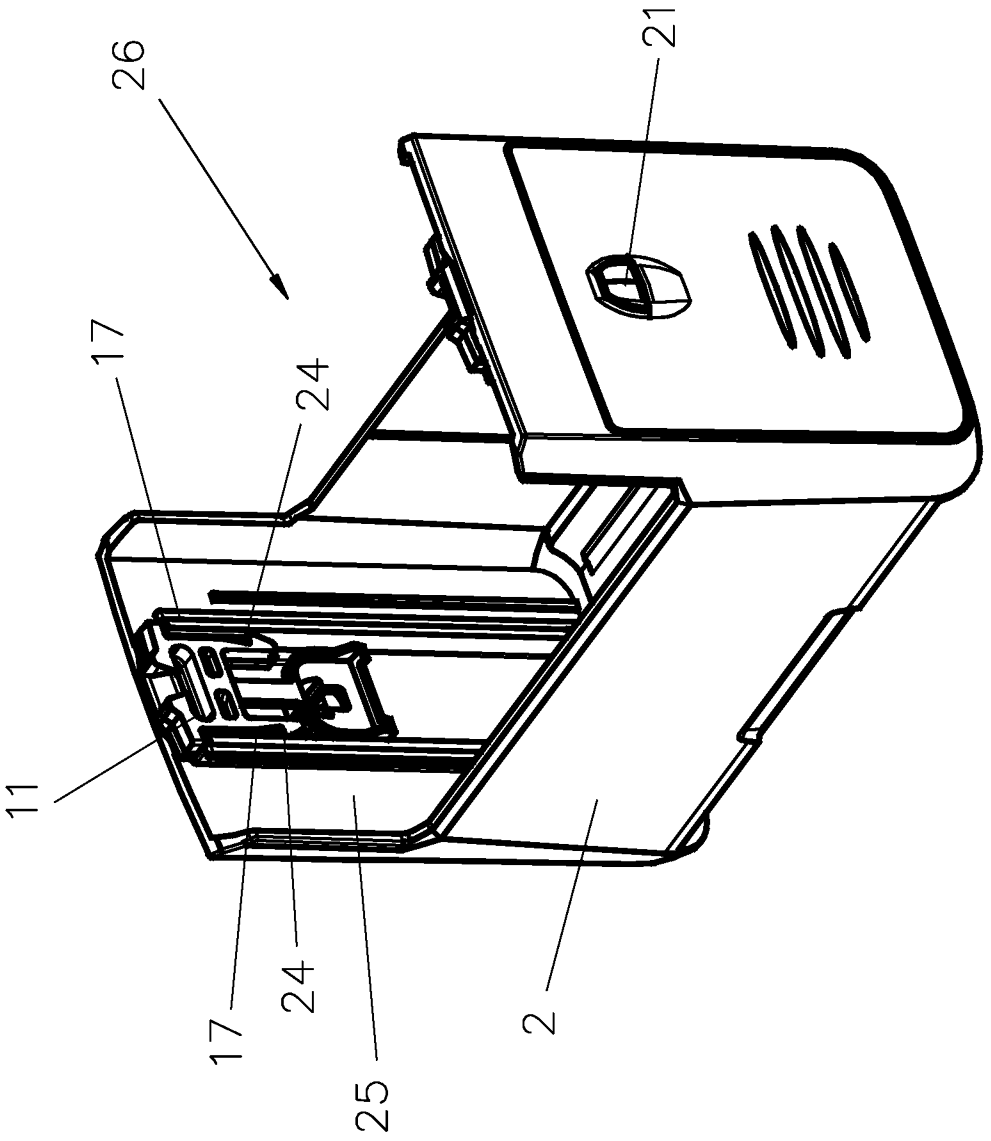
FIG. 6 is another schematic illustration with installed axle bearing element, from another side; simplified, for illustrative purposes only.

In order for the axle bearing element 11 to be mounted in the top part 2, the top part 2 has corresponding guide webs 17 into which the guide elements 16 of the latching elements 14 are inserted. Furthermore, guide webs 17 are provided with corresponding latching elements, in particular a latching edge 24, on which the latching hook 15 can engage, as can be seen in FIGS. 5 and 6; the guide webs 17 are arranged on the side faces 25 of the top part 2 on the side associated with the inner space 26. The axle bearing element 11 is inserted from below into the guide webs 17 and latches with the latching edge 24 on the guide web 17 so that it can no longer be separated from the top part 2 without applying appropriate force. Then the top part 2 is positioned over the bottom part 3, and the stamping insert 3 with the inserted axle 9 or trunnions is pushed through the slide track 8, whereupon the axle 9 is positioned at the insertion surface 18. By applying appropriate pressure to the stamping insert 3, the axle 9 is pressed onto the insertion surface 18, whereupon the side faces 25 are pressed slightly outwards until the axle 9 snaps or engages, respectively, into the elongated hole 13 or the elongated hole recess 13, so that the side surfaces 25 in turn return to their original position and the stamping insert 3 is mounted.

Concomitantly, when the axle bearing element 11 is inserted, the locking head 21 is slightly deformed, so that when during pushing in it is pushed along the inner surface of the side faces 25 until it engages or snaps, respectively, into the locking head opening 23, i.e. during assembly the locking head 21 is pressed slightly backwards by the flexible connecting web 20, whereby upon reaching the end position of the axle bearing element 11, in particular when the locking head 21 or the actuating element 22 of the locking head 21 coincides with the locking head opening 23, the latter pivots back into the original position and thus projects outwards through the locking head opening 23.

In addition, individual features or feature combinations from the various exemplary embodiments shown and described can inherently form independent inventive solutions or solutions according to the present disclosure.

The invention claimed is:

1. A stamp comprising at least a stamping component and a stamping insert, wherein the stamping component is formed of a top part and a bottom part with a cushion-receiving element wherein the stamping insert is connected to the top part via a reversing mechanism, the stamping insert being mounted via a continuous axle in an axle bearing element, wherein, in the resting position, a text plate and/or a mounted band unit mounted on the stamping insert butts against an ink cartridge with a pad soaked with stamp ink in the cushion -receiving element, and, in a stamping process for producing a stamp impression, in a stamp position, the stamping insert with the text plate and/or the mounted band unit is configured to be shifted by the reversing mechanism into a stamping position, wherein the axle bearing element is configured to be inserted and fastened in the top part via guide webs, and wherein a locking head for fixation of the stamp position is connected to the axle bearing element via an elastically deformable connecting web.

2. The stamp according to claim 1, wherein the axle bearing element includes at least a base body in which an elongated hole recess is formed for receiving and guiding an axle.

3. The stamp according to claim 1, wherein the guide webs for the axle bearing element are formed on side faces of the top part associated with an inner space of the top part.

4. The stamp according to claim 1, wherein the guide web has a latching element for fastening of the insertable axle bearing element.

5. The stamp according to claim 1, wherein the axle bearing element is configured to be inserted from below into the guide webs of the top part.

6. The stamp according to claim 1, wherein a locking head opening corresponding to the locking head is arranged on the top part.

7. The stamp according to claim 6, wherein, when the axle bearing element is inserted, the locking head projects outwards through the locking head opening, wherein the locking head is flush with the outer surface of a side face or projects beyond an outer surface of the side face.

8. The stamp according to claim 1, wherein the axle bearing element has a horizontally aligned elongated hole for receiving the axle for the impression unit, wherein an angularly extending insertion surface is arranged in the central region.

9. An axle bearing element for a stamp for fastening an impression unit, the axle bearing element comprising at least a base body in which a horizontally extending elongated hole or elongated hole recess is formed for receiving and guiding an axle or trunnion, wherein one or more elastically deformable latching elements are arranged on the base body, and a locking head is connected to the base body via an elastically deformable connecting web.

10. The axle bearing element according to claim 9, wherein the axle bearing element is formed as a one-piece injection-moulded plastic part.

11. The axle bearing element according to claim 9, wherein an angularly extending insertion surface for the insertion of the axle is arranged in the central region of the elongated hole or the elongated hole recess.

12. The axle bearing element according to claim 11, wherein two latching elements are arranged on the base body.

13. The axle bearing element according to claim 12, wherein the two latching elements are formed on an opposite side of the insertion surface on the base body, extending away from the base body.

14. The axle bearing element according to claim 12, wherein the connecting web for the locking head is connected to the base body between the two latching elements.

15. The axle bearing element according to claim 9, wherein the axle bearing element is formed from a **2*k*** injection molding, wherein the locking head is formed with a different plastic material than any remaining components are.

* * * * *